United States Patent [19]
Enomoto

[11] Patent Number: 5,305,040
[45] Date of Patent: Apr. 19, 1994

[54] APPARATUS FOR DRIVING BLUR CORRECTING LENS IN CAMERA

[75] Inventor: Shigeo Enomoto, Tokyo, Japan

[73] Assignee: Asahi Kogaku Kogyo Kabushiki Kaisha, Tokyo, Japan

[21] Appl. No.: 92,211

[22] Filed: Jul. 15, 1993

[30] Foreign Application Priority Data

Jul. 20, 1992 [JP] Japan .................. 4-192021

[51] Int. Cl.$^5$ .................. G03B 5/02; G03B 5/04
[52] U.S. Cl. .................. 354/202; 354/190
[58] Field of Search .................. 354/202, 430, 70, 123, 354/121, 190, 189

[56] References Cited

U.S. PATENT DOCUMENTS

| | | | |
|---|---|---|---|
| 4,864,339 | 9/1989 | Gross et al. | 354/202 |
| 5,117,246 | 5/1992 | Takahashi et al. | 354/202 |
| 5,153,633 | 10/1992 | Otani | 354/430 |
| 5,155,520 | 10/1992 | Nagasaki et al. | 354/430 |
| 5,231,445 | 7/1993 | Onuki et al. | 354/430 |

*Primary Examiner*—Michael L. Gellner
*Assistant Examiner*—Jae N. Noh
*Attorney, Agent, or Firm*—Kane, Dalsimer, Sullivan, Kurucz, Levy, Eisele and Richard

[57] ABSTRACT

A blur correcting lens driving apparatus of a camera in which a blur correcting lens is moved in a direction to eliminate a displacement, due to a camera shake, of an object image on a film plane, including a first rotary disk rotatably mounted to a stationary member of the camera to rotate about a first shaft parallel with an optical axis of the camera, a second rotary disk rotatably mounted to the first rotary disk to rotate about a second shaft parallel with the optical axis, a first motor provided on the stationary member of the camera to drive the first rotary disk about the first shaft, and a second motor provided on the first rotary disk to drive the second rotary disk about the second shaft.

16 Claims, 1 Drawing Sheet

APPARATUS FOR DRIVING BLUR CORRECTING LENS IN CAMERA

BACKGROUND OF THE INVENTION

1. Field of the Invention

The present invention relates to a blur correcting apparatus which prevents an image on a film plane from blurring, due to a displacement of an optical axis of a picture taking optical system of a camera, caused, for example, by camera shake. More precisely, it relates to a driving apparatus of a blur correcting lens in such a blur correcting apparatus.

2. Description of Related Art

Upon taking a hand-held photograph, an accidental movement of an optical axis of a picture taking optical system of the camera tends to occur due to a camera shake which is caused particularly when the camera is not held stably or firmly by the photographer, a picture of a dark object is taken at a slow shutter speed, or a photographer takes a picture while moving, etc. The blurred picture is not clearly seen due to the streaked image thereof. The blur caused by the camera shake can be eliminated to some extent, on one hand (solution from the viewpoint of hardware), by using a bright lens or increasing the film sensitivity to increase the shutter speed, and on the other hand (solution from the viewpoint of software) by improving the photographer's skill.

A solution to prevent the occurrence of blurring due to camera shake has been proposed, in which angular velocity or acceleration of the camera is detected and the blur correcting lens is moved opposite to the direction of camera shake to prevent movement of the image on the film plane.

However, to incorporate such a proposed blur correcting or preventing apparatus in a known compact camera, it is necessary to provide a simple, small and inexpensive blur correcting apparatus.

SUMMARY OF THE INVENTION

It is an object of the present invention to provide a simple, small and inexpensive driving apparatus of a blur correcting lens which can quickly and precisely move a blur correcting lens in accordance with a degree of the camera shake.

To achieve the object mentioned above, according to the present invention, there is provided a blur correcting lens driving apparatus in a blur correcting apparatus of a camera with a stationary member, including a blur correcting lens which is moved in a direction which prevents movement, due to camera shake, of an object image on a picture plane, wherein the blur correcting lens driving apparatus comprises a first rotating member rotatably mounted to the stationary member of the camera to rotate about a first shaft offset from and parallel to an optical axis of the camera, a second rotating member rotatably mounted to the first rotating member to rotate about a second shaft offset from and parallel to the optical axis of the camera, a first drive source provided on the stationary member of the camera to drive the first rotating member about the first shaft, and a second drive source provided on the first rotating member to drive the second rotating member about the second shaft.

With this structure, the correcting lens can be easily moved in approximate orthogonal directions by a simple driving mechanism.

According to another aspect of the present invention, there is provided a blur correcting lens driving apparatus in a blur correcting apparatus of a camera including a blur correcting lens which is moved in a direction which prevents movement, due to a camera shake, of an object image on a picture plane, comprising a first rotating member provided on an immovable part of the camera and having a first shaft parallel to an optical axis of the camera, a second rotating member provided on the first rotating member and having a second shaft parallel to the optical axis of the camera, said blur correcting lens being supported by the second rotating member, said first and second shafts being initially located on two orthogonal axes passing through the optical axis of the camera, a first drive source provided on the immovable part of the camera to rotate the first rotating member about the first shaft, and a second drive source provided on the first rotating member to rotate the second rotating member about the second shaft.

According to still another aspect of the present invention, provision is made for a blur correcting lens driving apparatus in a blur correcting apparatus of a camera including a blur correcting lens which is moved in a direction to eliminate a displacement of an object image on a picture plane due to a camera shake, comprising a stationary substrate, a first rotating member provided with a first shaft parallel to an optical axis of the camera, a second rotating member provided with a second shaft parallel to the optical axis of the camera, a first connecting means for rotatably connecting the first rotating member to the stationary substrate, a second connecting means for rotatably connecting the second rotating member to the first rotating member, a supporting means for supporting the blur correcting lens, a first driving means provided on the stationary substrate for rotating the first rotating member, a second driving means provided on the first rotating member for rotating the second rotating member, and a means for permitting the blur correcting lens to move with respect to the stationary substrate.

The present disclosure relates to subject matter contained in Japanese patent application No. 04-192021 (filed on Jul. 20, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
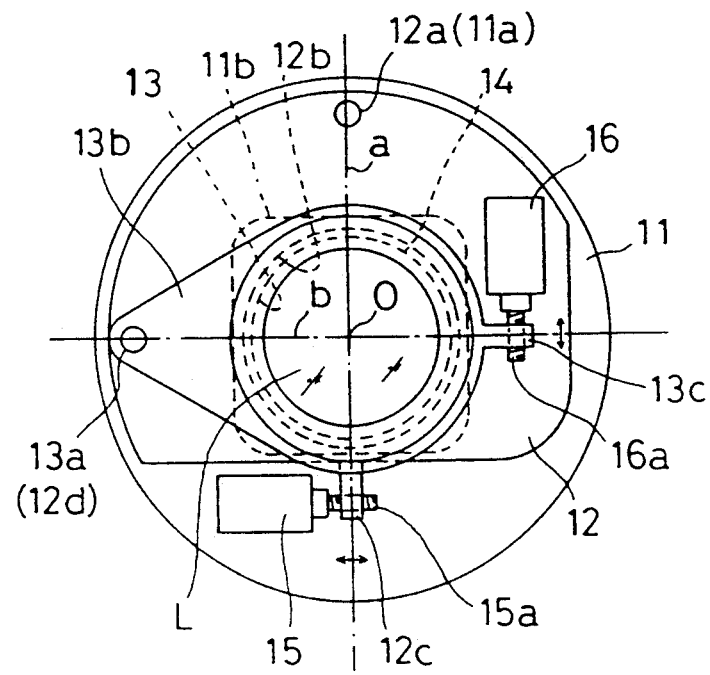
FIG. 1 is a front elevational view of a blur correcting lens driving apparatus of a blur correcting apparatus of a camera according to the present invention; and, FIG. 2 is an exploded view of a blur correcting lens driving apparatus shown in FIG. 1.
Figure 2:
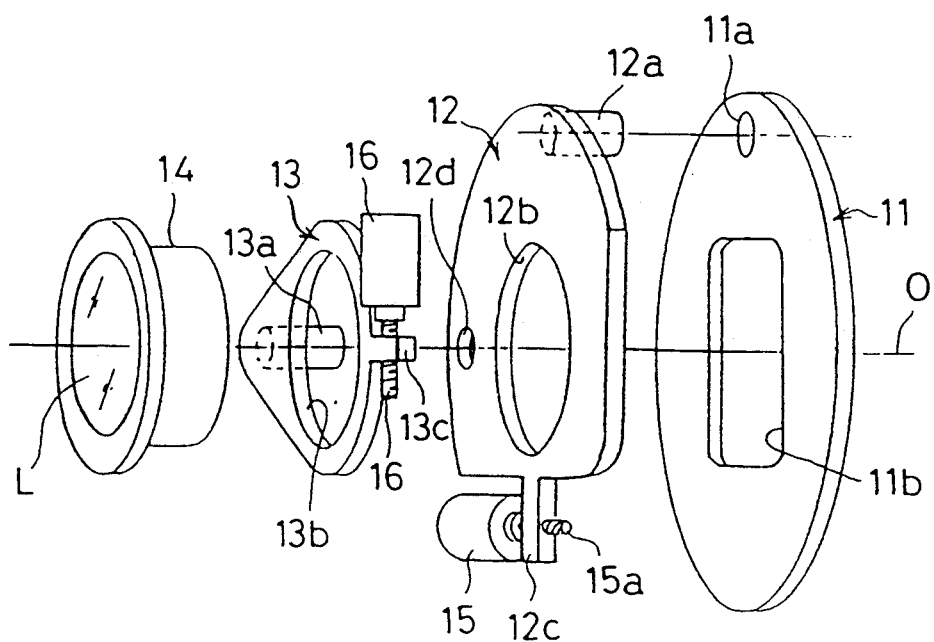

A blur correcting lens driving apparatus according to the present invention is provided between a taking lens or image forming lens (not shown) and a film or image pickup element (not shown) located at an image forming position in which an image of an object to be taken is formed by the taking lens.

A stationary substrate 11 is provided thereon with a first hole 11a and a blur correcting lens moving opening 11b whose center is located on the optical axis O of the taking lens. The first hole 11a is offset from the optical axis O outside the center opening 11b. The axis of the first hole 11a extends in parallel with the optical axis O. The stationary substrate 11 is secured to an immovable part of the taking lens, such as an outer lens barrel (not shown) of the taking lens, or a camera body.

A first rotary disk (rotating member) 12 has a first rotating shaft 12a which is provided in the vicinity of the outer peripheral edge thereof and rotatably fitted in the first hole 11a of the substrate 11. Consequently, the first rotary disk 12 is rotatable about the axis of the first rotating shaft 12a within a plane perpendicular to the optical axis O. The first rotary disk 12 is provided with a circular opening 12b with a center which is substantially coaxial to the optical axis O, a driving arm 12c which is located on the side opposite to the rotating shaft 12a with respect to the optical axis O, and a second hole 12d. The second hole 12d whose center axis extends in parallel with the optical axis O is offset from the optical axis O. The rotating shaft 12a (first hole 11a) and the second hole 12d are respectively located on orthogonal axes (straight lines) "a" and "b" passing through the optical axis O. The straight line "a" passes through the optical axis O as well as the axis of the rotating shaft 12a in an initial position of the first rotary disk 12.

A second rotary disk (rotating member) 13 has a second rotating shaft 13a which is provided in the vicinity of the outer peripheral edge thereof and rotatably fitted in the second hole 12d of the first rotary disk 12. Consequently, the second rotary disk 13 is rotatable about the axis of the second rotating shaft 13a within a plane perpendicular to the optical axis O. The second rotary disk 13 is provided with a center circular opening 13b with a center which is substantially coaxial to the optical axis O, and a driving arm 13c which is located on the side opposite to the second rotating shaft 13a with respect to the optical axis O. A blur correcting lens frame 14 which supports a blur correcting lens L is fitted in and secured to the circular opening 13b. Namely, the blur correcting lens frame 14 is supported by the stationary substrate 11 through the second rotary disk 13 and the first rotary disk 12.

The blur correcting lens frame 14 is loosely fitted in the center opening 12b of the first rotary disk 12 and the center opening 11b of the stationary substrate 11, so that the blur correcting lens frame 14 is movable (rotatable) through a predetermined angular displacement about the axes of the second and first rotating shafts 13a and 12a. Namely, the inner diameter of the center opening 12b of the first rotary disk 12 is slightly larger than the outer diameter of the blur correcting lens frame 14, so that the second rotary disk 13 can be rotated through a small angular displacement (e.g., a few millimeters) about the axis of the rotating shaft 13a (axis of the second hole 12d).

The stationary substrate 11 is provided thereon with a first driving motor 15 having a driving screw shaft 15a which is screwed in a threaded hole formed in the driving arm 12c of the first rotary disk 12. The first rotary disk is provided with a second driving motor 16 having a driving screw shaft 16a which is screwed in a threaded hole formed in the driving arm 13c of the second rotary disk 13. The screw shafts 15a and 16a extend in orthogonal directions perpendicular to the straight lines "a" and "b", respectively, so that when the screw shafts 15a and 16a are rotated, the first and second rotary discs 12 and 13 can be rotated about the axes of the first rotating shaft 12a (first hole 11a) and the second rotating shaft 13a (second hole 12d), respectively.

Strictly speaking, when the rotation of the first or second rotary disks 12 and 13 takes place, the screw shafts 15a, 16a and the corresponding threaded holes of the driving arms 12c and 13c are not exactly aligned. This is however negligible when the angular displacement of the driving arms 12c and 13c is small with respect to the radius of rotational movement. On the other hand, if the angular displacements of the driving arms 12c and 13c are large, the motors 15 and 16 are preferably mounted to the rotary discs 12 and 13 through pivot shafts, or flexible joints (not shown) are preferably provided between the drive shafts of the motors 15, 16 and the screw shafts 15a, 16a to absorb the angular displacements of the driving arms 12c and 13c, respectively.

The blur correcting apparatus as constructed above is provided, for example, at a rear end of a picture taking main optical system of a camera, so that the straight lines "a" and "b" are initially identical to the vertical and horizontal axes, respectively.

When the first driving motor 15 is driven with an output corresponding to the direction and magnitude of the horizontal component of the camera shake (movement of the optical axis of the taking lens) to rotate the first screw shaft 15a of the first driving motor 15, the first rotary disk 12 and accordingly the blur correcting lens L are rotated about the axis of the first rotating shaft 12a through the driving arm 12c in a direction to cancel the horizontal component of the camera shake (blur). Namely, since the second rotary disk 13 to which the blur correcting lens L is secured is supported on the first rotary disk 12, the blur correcting lens L is moved together with the first rotary disk 12 in the horizontal direction.

Similarly, when the second driving motor 16 is driven with an output corresponding to the direction and magnitude of the vertical component of the camera shake (movement of the optical axis of the taking lens) to rotate the second screw shaft 16a of the second driving motor 16, the second rotary disk 13 and accordingly the blur correcting lens L are rotated about the axis of the second rotating shaft 13a through the driving arm 13c in a direction to cancel the vertical component of the camera shake (blur). The movement of the second rotary disk 13 (blur correcting lens L) occurs within the center opening 12b of the rotary disk 12 without moving the first rotary disk 12.

Strictly speaking, the rotation of the blur correcting lens L takes place about the axes of the rotating shafts 12a and 13a. The rotational movement can be deemed to be a linear movement, since the movement of the blur correcting lens L necessary to correct the camera shake (blur) is 2 mm at the most according to experiments.

In the above-mentioned arrangement in which the approximate linear movements of the blur correcting lens L in the orthogonal directions are established by the rotational movements of the first and second rotary disks 12 and 13, the guide mechanism of the blur correcting lens L is simpler than that in an arrangement in which the real linear movements of the blur correcting lens in the orthogonal directions are carried out. In addition, the necessary torque of the driving motors in the former arrangement becomes approximately half that in the latter arrangement.

The precision of the approximate linear movement of the blur correcting lens L can be easily increased by improving the fitting tolerance between the first rotating shaft 12a and the first hole 11a and between the second rotating shaft 13a and the second hole 12d. Consequently, an accurate blur correction can be carried out.

Although the driving motors 15 and 16 are connected to the rotary disks 12 and 13 through the screw shafts in the illustrated embodiment, the present invention is not limited thereto. For instance, it is possible to provide cam mechanisms between the driving motors 15 and 16 and the corresponding rotary discs 12 and 13 to transmit the rotation of the driving motors 15 and 16 to the respective rotary discs 12 and 13. Moreover, the driving motors 15 and 16 can be replaced with other driving sources, such as piezoelectric devices or electromagnetic plungers, etc.

As can be seen from the above discussion, according to the present invention, since approximate linear movement of the blur correcting lens in the substantially orthogonal directions is caused by the rotational movements of the first and second rotary disks, the correcting lens driving mechanism can be simplified and miniaturized.

Furthermore, according to the present invention, the precision of the rotational movement of the rotary members can be relatively easily increased by increasing the dimensional precision of the rotating shafts, and accordingly, a highly precise lens driving apparatus can be easily realized. Moreover, according to the present invention, since the driving source (motor, etc.) for the second rotating member is provided on the first rotating member, the driving mechanism and the supporting mechanism thereof can be simplified.

I claim:

1. A blur correcting lens driving apparatus in a blur correcting apparatus of a camera including a blur correcting lens which is moved in a direction which prevents movement, due to camera shake, of an object image on a picture plane, comprising;
   a first rotating member provided on an immovable part of the camera and having a first shaft parallel to an optical axis of the camera;
   a second rotating member provided on the first rotating member and having a second shaft parallel to the optical axis of the camera, said blur correcting lens being supported by the second rotating member;
   said first and second shafts being initially located on two orthogonal axes passing through the optical axis of the camera;
   a first drive source provided on the immovable part of the camera to rotate the first rotating member about the first shaft; and,
   a second drive source provided on the first rotating member to rotate the second rotating member about the second shaft.

2. A blur correcting lens driving apparatus in a blur correcting apparatus of a camera including a blur correcting lens which is moved in a direction to eliminate a displacement, due to a camera shake, of an object image on a picture plane, comprising;
   a stationary substrate;
   a first rotating member provided with a first shaft parallel to an optical axis of the camera;
   a second rotating member provided with a second shaft parallel to the optical axis of the camera;
   a first connecting means for rotatably connecting the first rotating member to the stationary substrate;
   a second connecting means for rotatably connecting the second rotating member to the first rotor;
   a supporting means for supporting the blur correcting lens;
   a first driving means provided on the stationary substrate for rotating the first rotating member;
   a second driving means provided on the first rotor for rotating the second rotating member; and,
   a means for permitting the blur correcting lens to move with respect to the stationary substrate.

3. A blur correcting driving apparatus in a blur correcting apparatus of a camera with a stationary member, including a blur correcting lens which is moved in a direction which prevents movement, due to camera shake, of an object image on a picture plane, comprises;
   a first rotating member rotatably mounted to the stationary member of the camera to rotate about a first shaft offset from and parallel to an optical axis of the camera;
   a second rotating member rotatably mounted to the first rotating member to rotate about a second shaft offset from and parallel to the optical axis of the camera;
   a first drive source provided on the stationary member of the camera to drive the first rotating member about the first shaft; and,
   a second drive source provided on the first rotating member to drive the second rotating member about the second shaft.

4. A blur correcting lens driving apparatus according to claim 3, wherein said first and second shafts are initially located on orthogonal axes passing through the optical axis of the camera.

5. A blur correcting lens driving apparatus according to claim 3, wherein said stationary member, said first rotating member, and said second rotating member are respectively a stationary substrate, a first rotary disk, and a second rotary disk, juxtaposed along the optical axis in this order.

6. A blur correcting lens driving apparatus according to claim 5, wherein said stationary substrate, said first rotary disk, and said second rotary disk lie in parallel planes perpendicular to the optical axis.

7. A blur correcting lens driving apparatus according to claim 6, wherein said second rotary disk is provided with an opening in which the blur correcting lens is fitted and secured.

8. A blur correcting lens driving apparatus according to claim 7 further comprising a lens frame which supports the blur correcting lens and which is fitted and secured in the opening of the second rotary disk.

9. A blur correcting lens driving apparatus according to claim 8, wherein said first rotary disk is provided with an opening in which the blur correcting lens is fitted to rotate about the second shaft.

10. A blur correcting lens driving apparatus according to claim 8, wherein said stationary substrate is provided with an opening in which the blur correcting lens is fitted to rotate about the first and second shafts.

11. A blur correcting lens driving apparatus according to claim 5, wherein said first drive source is provided on the same side of the stationary substrate opposite to the first shaft with respect to the optical axis.

12. A blur correcting lens driving apparatus according to claim 5, wherein said second drive source is provided on the same side of the first rotary disk opposite to the second shaft with respect to the optical axis.

13. A blur correcting lens driving apparatus according to claim 11, wherein said first drive source is a motor which is provided with a screw shaft which is threadedly engaged to the first rotary disk.

14. A blur correcting lens driving apparatus according to claim 5, wherein said second drive source is a motor which is provided with a screw shaft which is threadedly engaged to the second rotary disk.

15. A blur correcting lens driving apparatus according to claim 13, wherein said first rotary disk is provided with a first drive arm having a threaded hole in which the screw shaft of the first motor is screw-engaged.

16. A blur correcting lens driving apparatus according to claim 14, wherein said second rotary disk is provided with a second drive arm having a threaded hole in which the screw shaft of the second motor is screw-engaged.

* * * * *